United States Patent
Tom et al.

(10) Patent No.: US 7,289,805 B2
(45) Date of Patent: Oct. 30, 2007

(54) METHOD AND SYSTEM FOR PROVIDING A TEMPORARY SUBSCRIBER IDENTITY TO A ROAMING MOBILE COMMUNICATIONS DEVICE

(75) Inventors: Frank Tom, Ottawa (CA); Andre Moskal, Kanata (CA)

(73) Assignee: Newstep Networks Inc., Toronto, Ontario (CA)

( * ) Notice: Subject to any disclaimer, the term of this patent is extended or adjusted under 35 U.S.C. 154(b) by 130 days.

(21) Appl. No.: 11/078,393

(22) Filed: Mar. 14, 2005

(65) Prior Publication Data
US 2006/0205434 A1 Sep. 14, 2006

(51) Int. Cl.
*H04Q 7/20* (2006.01)
(52) U.S. Cl. .............. 455/432.1; 455/435.1; 455/432.2; 455/432.3; 455/436; 455/439
(58) Field of Classification Search ......... 455/435.1, 455/432.2, 436, 448, 439, 442, 432.3, 432.1
See application file for complete search history.

(56) References Cited

U.S. PATENT DOCUMENTS 5,920,814 A * 7/1999 Sawyer et al. ......... 455/422.1
7,054,629 B2 * 5/2006 Turina et al. ............ 455/432.1
7,155,222 B1 * 12/2006 Jain et al. ................. 455/435.1
2002/0061746 A1 * 5/2002 Jo et al. ..................... 455/433
2003/0092446 A1 * 5/2003 Boivin ....................... 455/445
2004/0087305 A1 * 5/2004 Jiang et al. .............. 455/432.1
2004/0097216 A1 * 5/2004 Mademann ................ 455/410
2004/0192306 A1 9/2004 Elkarat et al. .......... 455/435.1

FOREIGN PATENT DOCUMENTS

WO WO 2004/049744 A1 6/2004

* cited by examiner

*Primary Examiner*—Lester G. Kincaid
*Assistant Examiner*—Khai Nguyen
(74) *Attorney, Agent, or Firm*—Kent Daniels; Ogilvy Renault LLP (57) ABSTRACT

A system provides a service to mobile devices that permits the mobile devices to substantially avoid roaming charges while roaming in visited networks. A temporary subscriber identity (TSI) server receives a TSI request message from a TSI client operating on a roaming mobile device. If available, a temporary service identity is returned to the TSI client, which registers the mobile communications device with a specified service provider as a home subscriber using the temporary service identity.

20 Claims, 8 Drawing Sheets

METHOD AND SYSTEM FOR PROVIDING A TEMPORARY SUBSCRIBER IDENTITY TO A ROAMING MOBILE COMMUNICATIONS DEVICE

CROSS-REFERENCE TO RELATED APPLICATIONS

This is the first application filed for the present invention.

MICROFICHE APPENDIX

Not Applicable.

TECHNICAL FIELD

This invention relates in general to mobile communications devices and, in particular, to a system and method for dynamically changing an identity of a roaming mobile communications device to reduce roaming access fees and long distance charges for a user of the mobile communications device while the user is roaming outside a home service area.

BACKGROUND OF THE INVENTION

Figure 1:
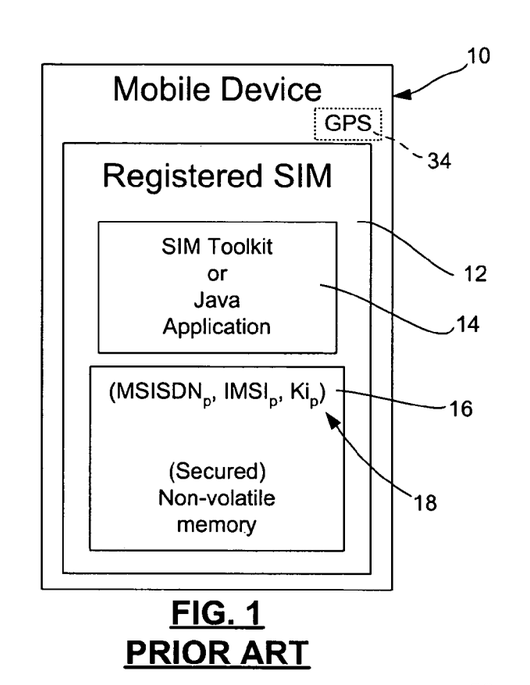
FIG. 1 is a schematic diagram of a prior art mobile communications device in accordance with the GSM standard.

In a mobile communications network, the identity of a mobile communications device is determined by identification information stored in a permanent memory of the communications device. For example, as shown in FIG. 1 in a Global System for Mobile Communications (GSM) network, a mobile communications device 10 is identified by information stored in a Subscriber Identity Module (SIM) card 12 that is docked in the mobile communications device 10. The SIM card 12 is generally an Integrated Circuit Card (ICC), also known as a SmartCard. Permanent identity information 18 stored in a non-volatile memory 16 of the SIM card 12 consists of an International Mobile Subscriber Identity (IMSI), a Mobile Station Integrated Services Digital Network (MSISDN) number, which is the dialable mobile communications device number, and an Authentication Key (Ki). The SIM card may also include a SIM ToolKit or Java application 14 for enabling various mobile functions known in the art. The mobile communications device 10 may likewise include a Global Positioning System (GPS) 34 that provides location information of the mobile communications device 10 to the SIM card 12.

It is well understood that when a mobile telecommunications service subscriber roams outside of their home network, the subscriber identity information identifies the mobile communications device as a roaming device and any voice calls or data connections destined to the subscriber's mobile communications device are routed to the subscriber's home network and then redirected to the service provider network where the roaming subscriber is being served. Normally, service charges apply to all redirected voice and/or data traffic. In addition, the mobile service subscriber is usually required to pay roaming access charges to the home and visiting service provider networks for accessing all services in the visited network. The roaming access fees and long distance service charges are significantly higher than standard service fees charged by the home service provider for the same services. Consequently, mobile subscribers are seeking options for reducing the service fees incurred when they are roaming outside of their home network.

Methods of reducing service fees incurred while roaming are known. A first known method is the use of multiple SIM cards. A second known method is the use of a multiple-identity SIM card that stores multiple subscriber identities.

If multiple SIM cards are used, the subscriber must be aware each time he roams into the service area of another mobile service provider, and must manually swap the SIM card for one having an IMSI, MSISDN number and Ki that is registered as a home subscriber with the service provider serving that service area.

Likewise, if a multi-identity SIM card is used the subscriber must select an appropriate subscriber identity when registering with a new service provider, so that the roaming subscriber is recognized by the new service provider network as a home service subscriber. However, such SIM cards store a limited number of subscriber identities, which may not be adequate for a user that roams to several different service areas. As well, selecting a new subscriber identity can be complicated and failure to do so at an appropriate time can result in undesirable roaming charges and extra toll call fees.

As can be appreciated by those skilled in the art, each of these known methods requires the performance of tasks that are inconvenient, disruptive and subject to error.

There therefore remains a need for a convenient, effective service that reduces service charges levied against mobile communications device users who roam into service areas that are not served by their home service provider network.

SUMMARY OF THE INVENTION

It is therefore an object of the invention to provide a system and method for reducing service charges payable by mobile communications device users who roam into service areas that are not served by their home service provider network.

The invention therefore comprises a system for providing a temporary subscriber identity to a mobile communications device roaming into a service area of a service provider network that does not serve the mobile communications device as a home subscriber, to permit the roaming mobile communications device to function as a home subscriber in the service provider network, the system comprising: a temporary subscriber identity (TSI) server that receives and processes TSI request messages; and a TSI client on the mobile communications device that inspects service provider information from the service provider network, directs temporary registration of the mobile communications device with the service provider network using a permanent subscriber identity assigned to the mobile communications device to open a data communications channel through the service provider network, and subsequently sends the TSI request message over the data communications channel to request the temporary subscriber identity associated with the service provider network, receives the temporary subscriber identity from the TSI server, and directs the mobile communications device to re-register with the service provider, so that the mobile communications device is registered with the service provider as a local service subscriber for at least a predetermined period of time.

The invention further comprises a method of providing a temporary subscriber identity to a mobile communications device roaming in a service area of a service provider network that does not serve the mobile communications device as a home subscriber, to permit the roaming mobile communications device to function as a home subscriber in the service provider network, the method comprising:

receiving a request from a temporary subscriber identity (TSI) client for a temporary subscriber identity that is registered as a home subscriber in the service provider network; authenticating an entitlement of the mobile communications device to a TSI service that provides the temporary subscriber identity; selecting a temporary subscriber identity associated with the service provider network; and returning the temporary subscriber identity to the TSI client.

The invention further comprises a method of obtaining a temporary subscriber identity for a roaming mobile communications device in order to obtain service as a home subscriber from a service provider network serving an area in which the mobile communications device is roaming, the method comprising: formulating a request for a temporary subscriber identity and sending the request to a temporary subscriber identity (TSI) server; receiving a response from the TSI server containing a service provider identification code and the temporary subscriber identity; and registering with a service provider network identified by the service provider identification code using the temporary service subscriber identity.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a system and a method for dynamically assigning a temporary subscriber identity to a mobile communications device that roams into an area served by a service provider network that does not serve the mobile communications-device as a home subscriber device. The system includes a temporary subscriber identity (TSI) server and a (TSI) database as well as a TSI client installed on the mobile communications device. Whenever the TSI client detects a change of service provider to any service provider other than the home service provider, the TSI client formulates a TSI request message that is sent to the TSI server requesting a temporary subscriber identity. The temporary subscriber identity is registered with the new network service provider and the new network service provider recognizes the temporary subscriber identity as a home subscriber identity. On receipt of the temporary subscriber identity, the TSI client directs the mobile communications device to re-register with the new service provider network using the temporary subscriber identity. Thereafter, the mobile communications device is served by the new service provider network as a home subscriber. Roaming fees and extra long distance charges are thereby reduced.

Figure 2:
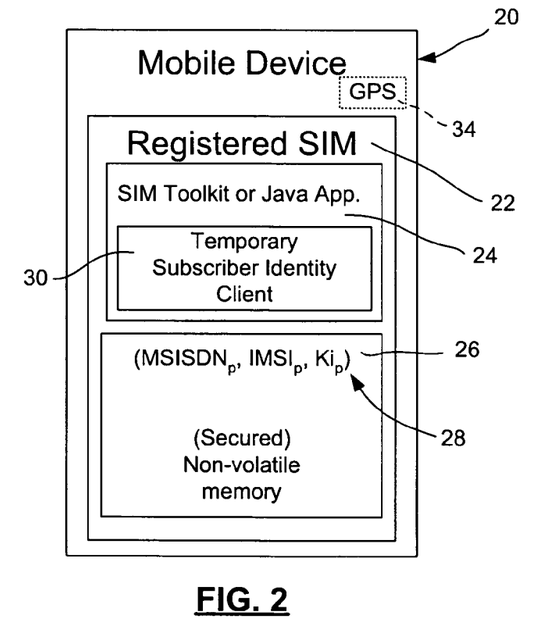
FIG. 2 is a schematic diagram of a mobile communications device shown in FIG. 1 provisioned with a temporary subscriber identity client in accordance with the invention.

FIG. 2 is a schematic diagram of a mobile communications device 20 in accordance with the invention. The mobile communications device 20 shown in FIG. 2 is a Global System for Mobile Communications (GSM) device equipped with a Subscriber Identity Module (SIM) card 22, which is well known in the art. Although the invention will hereinafter be described with reference to GSM mobile communications devices, it should be understood that the invention is equally applicable to other types of mobile telecommunications networks, including Code Division Multiple Access (CDMA) as well as any other wireless communication standards.

The SIM 22 is provisioned with a SIM ToolKit or a Java application 24, which provides program code modules that are well known in the art and employed by a temporary subscriber identity (TSI) client 30 to perform certain functions and procedures in accordance with the invention. The SIM 22 has a secured, non-volatile memory 26 that stores a permanent subscriber identity (MSISDN, IMSI, and Ki). The MSISDN, IMSI and Ki are assigned by the home network service provider to the SIM 22, in a manner well known in the art. The mobile communications device 20 in accordance with the invention may likewise include a Global Positioning System (GPS) 34 that provides location information of the mobile communications device 20 to the SIM card 12.

Figure 3:
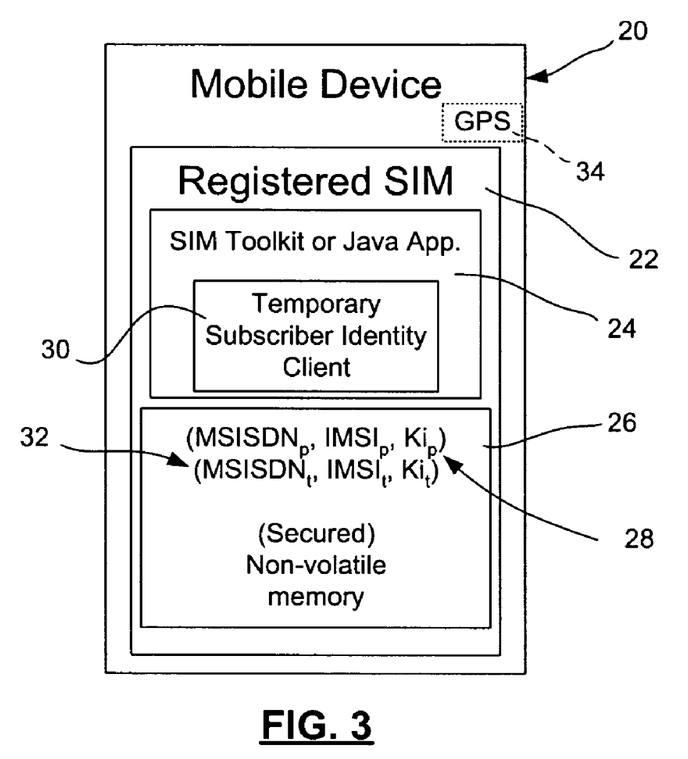
FIG. 3 is a schematic diagram of the mobile communications device shown in FIG. 2, after the mobile communications device has been assigned a temporary subscriber identity.

FIG. 3 is a schematic diagram of the mobile communications device 20 shown in FIG. 2 after the TSI client 30 has requested and received a temporary subscriber identity 32, which is stored in the non-volatile memory 26 along with the permanent subscriber identity 28. The manner in which the TSI client 30 requests, receives and uses the temporary subscriber identity 32 is described below in detail with reference to FIGS. 7-9.

Figure 4:
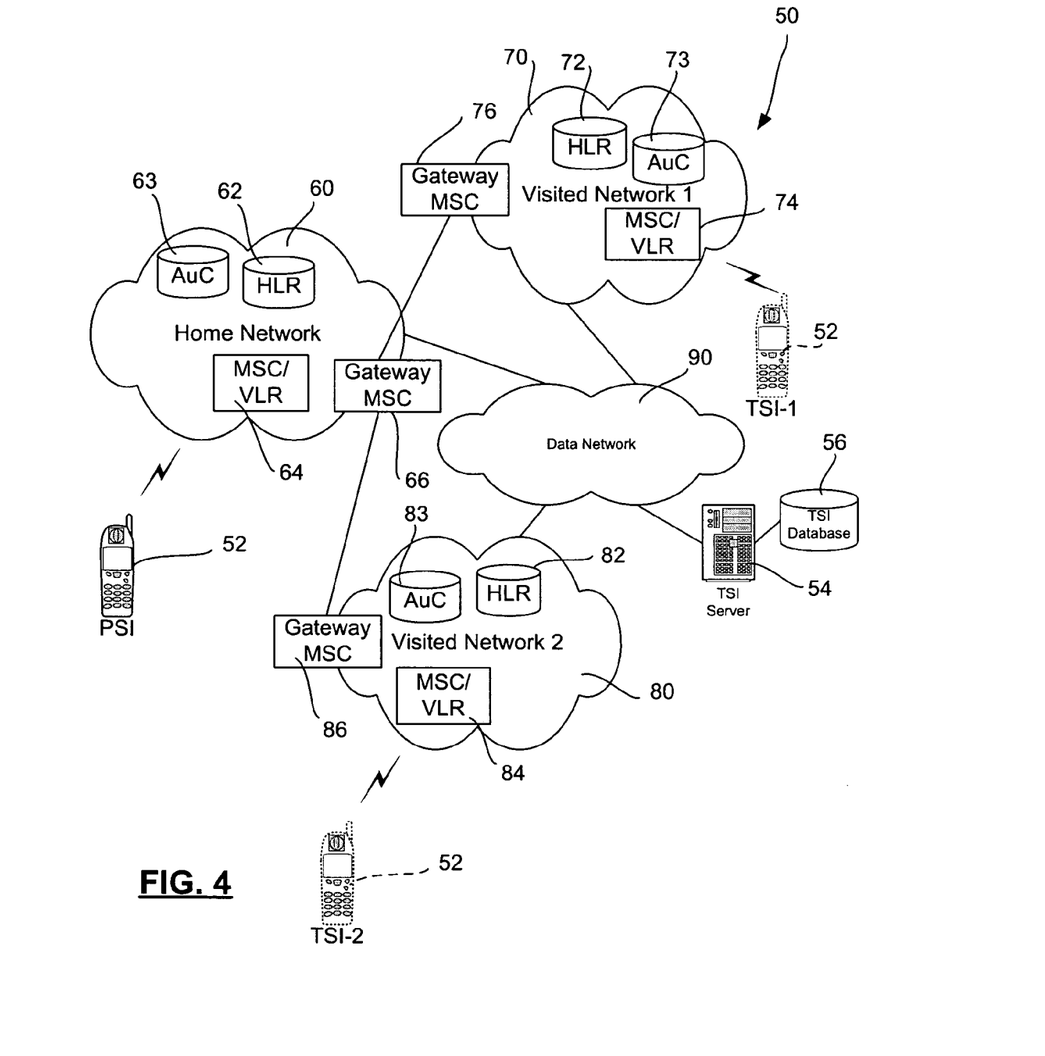
FIG. 4 is a schematic diagram of a system in accordance with the invention shown in a typical use environment.

FIG. 4 is a schematic diagram of a system in accordance with the invention shown in an exemplary environment. A mobile communications device 52, provisioned the same as the mobile communications device 20 shown in FIG. 2, having a permanent subscriber identity 28 normally operates within a home network 60. The home network 60 includes a home location register (HLR) 62 and an Authentication Center (AuC) 63 that function in a manner well known in the art. A plurality of mobile switching centers (MSC/VLR) 64, each supporting a visitor location register (VLR), provide service to the mobile communications device 52. A gateway MSC 66 provides inter-network connections via corresponding gateway MSCs 76,86 to other service provider networks such as visited network 70 and visited network 80. Each of the visited service provider networks includes an HLR 72,82, an AuC 73,83 respectively, and a plurality of MSCs 74,84, each supporting a VLR.

Each of the respective service provider networks 60, 70, 80 is connected to a data network 90, such as the Internet. The data network 90 supports data communications in a manner well understood in the art. Also connected to the data network 90 is a TSI server 54 in accordance with the invention, which will be explained below in detail with reference to FIGS. 6-9. The TSI server 54 performs subscriber authentication and temporary subscriber identity selection. Either one or both of subscriber authentication data and temporary subscriber identity data may be retrieved from a TSI database 56.

When the mobile communications device 52 roams in a service area served by a visited network 70, for example, it obtains a temporary subscriber identity (TSI-1) that is registered with the visited network 70 and recognized by that network as a home subscriber identity. When the mobile communications device 52 roams in a service area served by a visited network 80, it obtains a temporary subscriber identity (TSI-2) registered with the visited network 80 and recognized by that network as a home subscriber identity. Consequently, when the mobile communications device 52 roams in a territory served by visited network 70 it is served as a home subscriber after it obtains the TSI-1, as will be explained below in detail. The same holds true when the mobile communications device 52 roams in a visited network 80.

Figure 5:
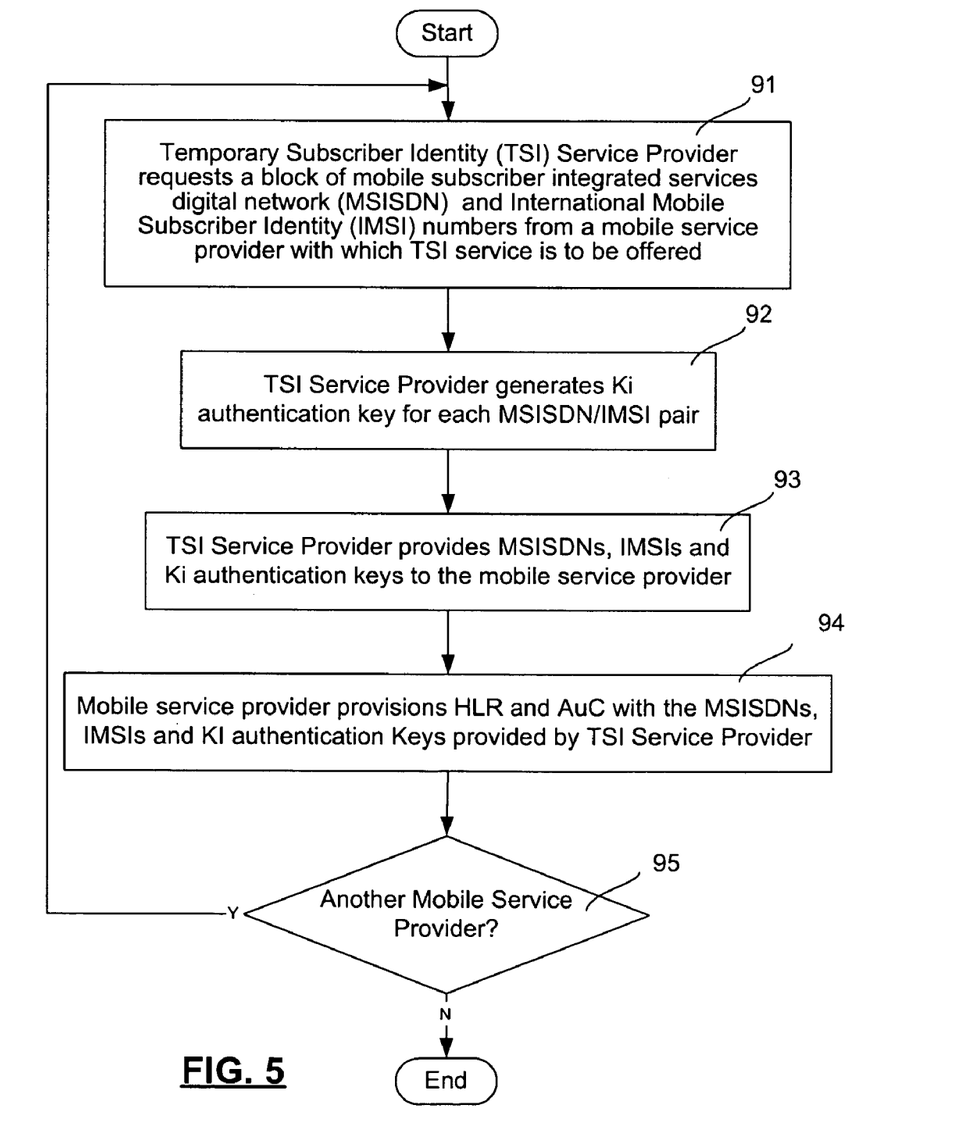
FIG. 5 is a flow chart illustrating principle steps in a process of acquiring and provisioning temporary subscriber identities for providing a service in accordance with the invention.

As can be understood by those skilled in the art, a temporary subscriber identity service in accordance with the invention cannot be offered without pre-provisioning of the required temporary subscriber identities that are assigned to roaming mobile communications device 52. FIG. 5 is a flow chart illustrating principle steps in pre-provisioning the required temporary subscriber identities.

In step 91, a TSI service provider, which may be the home service provider 60, a Mobile Virtual Network Operator (MVNO), or any other mobile service provider that has undertaken to provide a TSI service, requests a block of International Mobile Subscriber Identity (IMSI) and Mobile Subscriber Integrated Services Digital Network (MSISDN) numbers from a service provider that operates a service provider network where the temporary subscriber identity service is to be offered. Normally, network service providers sell IMSI/MSISDN numbers in blocks of a requested size, in a manner well known in the art.

After the requested block of IMSI/MSISDN numbers are obtained, the TSI service provider provisions the TSI database 56 (FIG. 4) by storing the IMSI/MSISDN numbers and generating a Ki authentication key for each IMSI/MSISDN number pair (step 92). The TSI service provider then provides the respective MSISDN, IMSI and Ki authentication keys to the service provider from which the block of IMSI/MSISDN numbers was acquired (step 93). In step 94 the service provider from which the block of IMSI/MSISDN numbers was acquired provisions their HLR and AuC with the MSISDNs, IMSIs and Ki authentication keys provided by the TSI service provider. In step 95 it is determined whether the TSI service will be provided in another service provider network. If so, steps 91-94 are reiterated. If not, the process ends. After this provisioning is completed, TSI service can be offered to mobile communications device 52 as explained below with reference to FIGS. 6-9.

Figure 6:
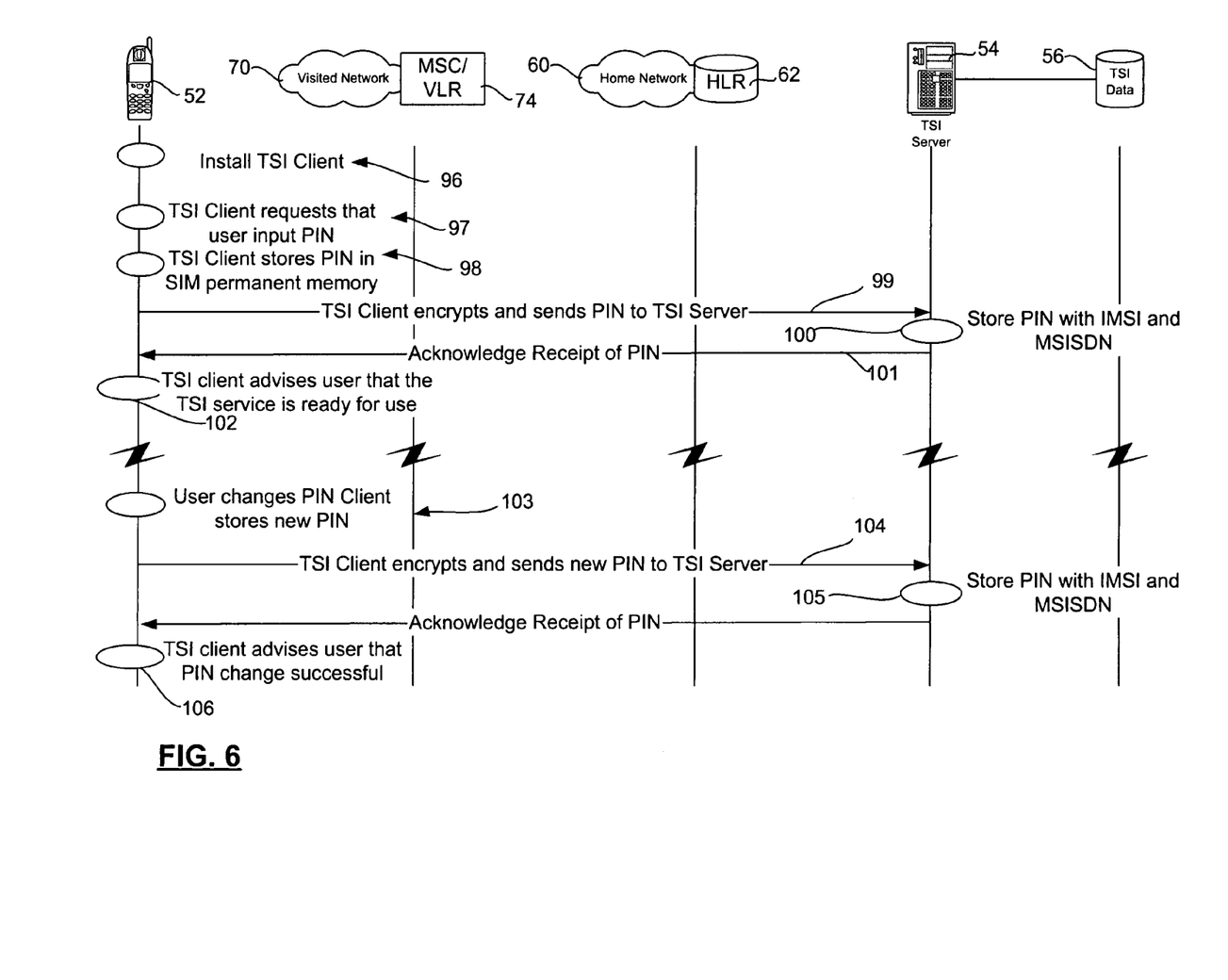
FIG. 6 is a message flow diagram showing principle steps involved an exemplary initial service setup of a temporary subscriber identity service in accordance with the invention.

FIG. 6 is a message flow diagram showing principle steps in an exemplary initial service registration process in accordance with the invention. In accordance with the invention, the TSI service is enabled on the mobile communications device 52 by installing TSI client 30 software (step 96) on the mobile communications device 52. When that installation process is complete, the TSI client displays a user interface that requests the user to input a personal identification number (PIN), which may be any alphanumeric string that complies with a pre-defined set of security criteria. Typically, the user interface asks the user to confirm the PIN input by inputting the same PIN as confirmation. In any event, once the PIN has been entered in accordance with pre-defined rules, the TSI client stores the PIN in the SIM non-volatile memory 26 (step 98) and then forwards the PIN to the TSI server (step 99), preferably in a format encrypted using a ciphering key generated from the Ki key associated with subscriber permanent identity 28. The TSI server 54 decrypts and stores the subscriber PIN (step 100). The subscriber PIN is an information element that the TSI server 54 uses to authenticate the TSI service and renewal requests from a TSI client 30. Other information elements may also be used for the same purpose. The TSI server 54 then acknowledges safe receipt of the subscriber PIN (step 101). On receipt of the acknowledgement from the TSI server 54, the TSI client 30 advises the user of the mobile communications device 52 that the TSI service is ready for use (step 102). This may be accomplished by displaying a message on a display screen of the mobile communications device 52, for example.

At some later time, the user of the mobile communications device 30 decides to change the PIN and selects a "Change PIN" function (not shown) from the user interface supported by TSI client 30. After the new PIN has been entered and confirmed (step 102), the TSI client 30 encrypts the PIN using a ciphering key generated from the permanent Ki authentication key, and sends the encrypted PIN to the TSI server 54 (step 104). As described above, the TSI server 54 stores the new user PIN along with the IMSI and MSISDN (step 105), and then returns an acknowledgement message in step 106. On receipt of the acknowledgement message, the TSI client advises the user of the mobile communications device 30 that the PIN has been successfully changed, and service continues as described below with reference to FIGS. 7-9.

Figure 7:
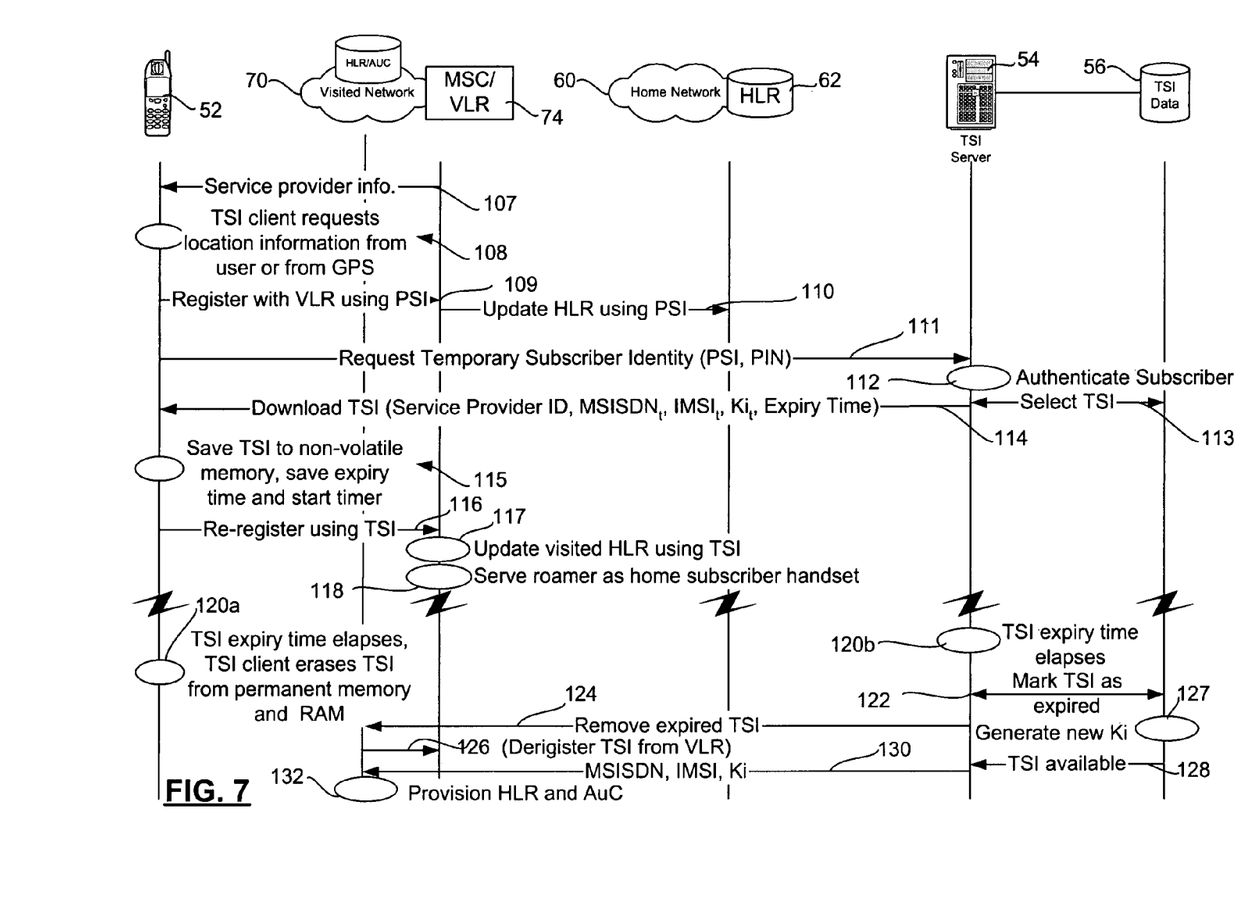
FIG. 7 is a message flow diagram showing principle steps involved in providing a temporary subscriber identity service in accordance with the invention.

FIG. 7 is a message flow diagram schematically illustrating principle messages exchanged among service provider networks and the system in accordance with the invention when a mobile communications device 52 uses the TSI service in accordance with the invention. As shown in FIG. 7, when the mobile communications device 52 roams into a service area served by a visited network 70 it receives the service provider identification information (step 107) from a serving base station transceiver of the visited network 70, in a manner well understood in the art. The TSI client 30 (FIG. 2) constantly monitors the service provider information received by the mobile communications device 52 and on determining that the service provider information does not identify the home network 60, the TSI client 30 may display a user interface to request location information from the user of the mobile communications device 52, or request location information from the GPS 34 in the mobile communications device 52. Alternatively, the TSI client 30 may proceed without location information and rely on the TSI server 54 to determine the location of the mobile communications device 52 using GPS or location-based services, if available. The location information preferably identifies a city and a country in which the user of the mobile communications device 52 is currently located (step 108). The TSI client 30 then directs the mobile communications device 52 to register with the visited network 70 using the permanent subscriber identity 28 in order to open a data communications channel needed to request a temporary subscriber identity (step 109). In response, the MSC 74 records the permanent subscriber identity in its VLR and in step 110 forwards a signaling message to the HLR 62 of the home network 60 to update the HLR 62 with the current location information for the mobile communications device 52.

Using the opened data communications channel, the TSI client 30 directs the mobile communications device 52 to requests a temporary subscriber identity by sending a data message to the TSI server 54 (step 111). The TSI request message includes the subscriber's PIN, permanent IMSI, permanent MSISDN, an identity of the visited network 70 (carrier ID and name), and the location information if it was gathered in step 108, as well as a country code and location area ID of the roaming location, if available, and any other information that may be useful to authenticate or better serve the mobile communications device 52. In step 112, the TSI server 54 authenticates the subscriber. This may be done in any one of several ways. For example, the TSI server 54 may authenticate the subscriber by searching a list of TSI service subscriber PIN/permanent IMSI for the PIN/permanent IMSI received in a TSI request message sent from a TSI client 30. If the subscriber is authenticated, the TSI server 54 selects a temporary subscriber identity (step 113) using the location information and the visited network 70 identity by querying the TSI database 56, which may be a remote database, an internal database or any other memory of the TSI server 54. It should be understood that the subscriber authentication (step 112) may likewise involve a query to the TSI database 56.

As will be understood by those skilled in the art, the subscriber authentication and the TSI selection are not necessarily performed together, or by querying the same database, even though both operations are shown by way of example as being performed by query sent to the TSI database 56. As will also be understood by those skilled in the art, encryption is normally used to transmit the data between the TSI server 54 and the TSI client 30 and vice versa. The encryption is, for example, based on ciphering and deciphering keys generated from the permanent authentication key Ki.

If the subscriber authentication is successful and a temporary subscriber identity is available for the visited network 70 or another service provider that serves the same location, a temporary subscriber identity 32 is returned to the TSI server 54 and the TSI server 54 downloads the temporary subscriber identity in step 114. The download includes a network provider identification code, which may be the same network provider identity sent in the request message in step 111 or, as explained above, that of another network provider that serves the same service area. The download further includes a temporary MSISDN (MSISDN$_t$) a temporary IMSI (IMSI$_t$) a temporary authentication key (Ki$_t$) and an expiry time after which the temporary subscriber identity is no longer valid.

In step 115, the TSI client saves the temporary subscriber identity 32 to the non-volatile memory 26 of the mobile communications device 52. The TSI client 30 then directs the mobile communications device 52 to re-register with the service provider network identified by service provider identification information sent in step 114. The re-registration (step 116) is performed using a SIM ToolKit refresh function, which is known in the art. On re-registration, the MSC/VLR 74 advises (step 117) the visited network HLR/AuC of the registration of the mobile communications device 52 using the TSI, and the visited HLR/AuC records an identity of the VLR where the TSI user is registered. Subsequent to the re-registration performed in step 116, the visited network 70 serves the mobile communications device 52 as home subscriber device (step 118).

FIG. 7 assumes that the mobile communications device leaves an area served by the visited network 70 prior to lapse of the expiry time for the temporary subscriber identity. In the example shown in FIG. 7, the TSI client 30 and the TSI server 54, which both track the expiry time for the temporary subscriber identity 32, determine in steps 120a and 120b that the expiry time for the temporary subscriber identity has elapsed. In step 120a, the TSI client 30 running on the mobile communications device 52 determines that the expiry time for the temporary subscriber identity has elapsed. The TSI client 30 therefore erases the temporary subscriber identity from the permanent memory and, if it still exists in the random access memory, it is erased from the random access memory as well.

The TSI server 54 also determines that the TSI expiry time has elapsed (step 120b). The TSI server 54 notifies the TSI database 56 to mark the TSI as expired. The TSI server 54 also sends a message to HLR/AuC 72,73 of the visited network 70 requesting that the expired TSI be removed (step 124). The HLR/AuC 72,73 of the visited network 70 complies by removing the TSI profile associated with the TSI and sends a message to the MSC/VLR (step 126) instructing the VLR to deregister the TSI and the corresponding TSI profile is removed from the VLR as instructed (not shown).

Meanwhile, the TSI database 56 generates a new Ki authentication key (step 127) and advises the TSI server in step 128 that the TSI is once again available for use. The message sent in step 128 includes the MSISDN$_t$, the IMSI$_t$ and Ki$_t$. The TSI server 54 forwards the available TSI to the visited network 70 (step 130) and the visited network 70 provisions the HLR/AuC 72,73 with the TSI (step 132). Thereafter, the temporary subscriber identity is available for use by another roaming mobile communications device.

Figure 8:
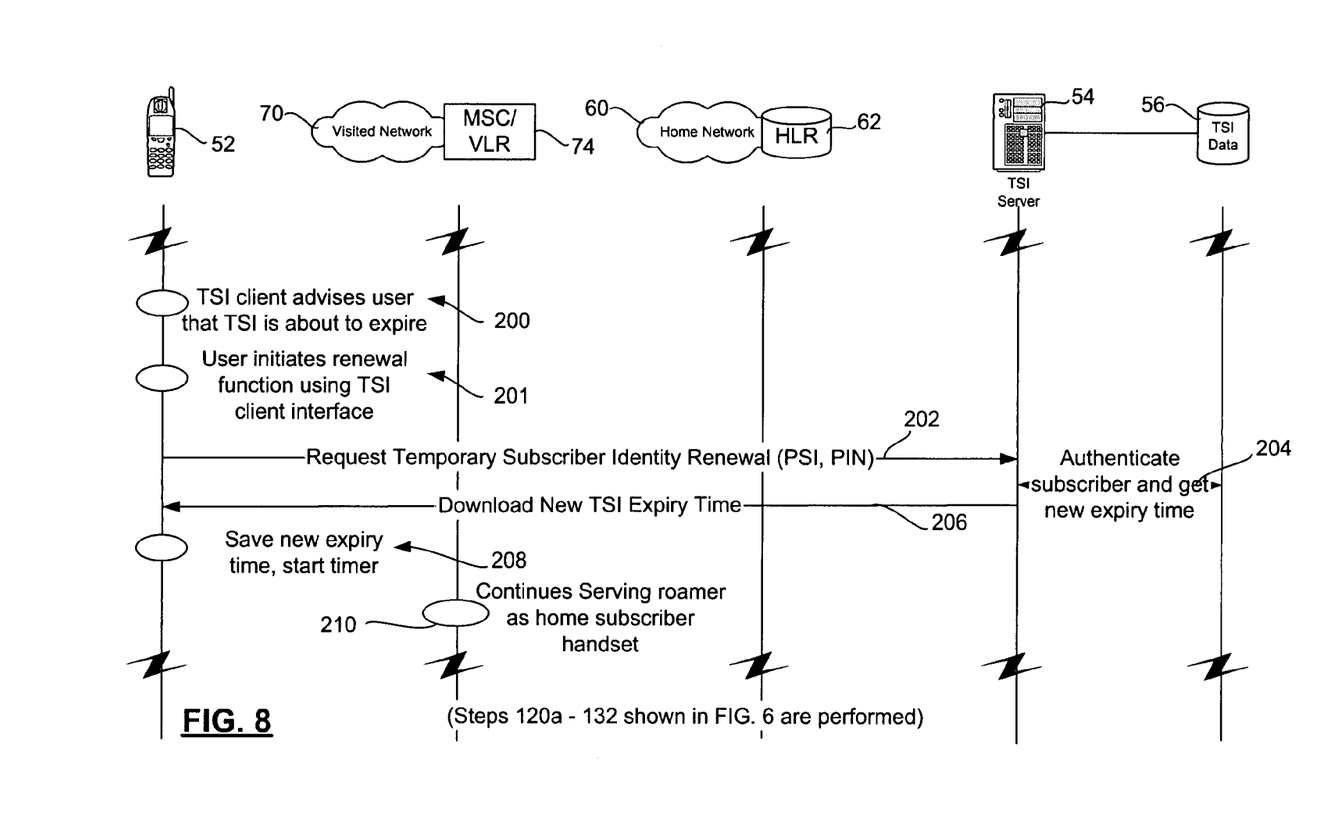
FIG. 8 is a message flow diagram illustrating principle steps involved in renewing a temporary subscriber identity in accordance with the invention.

FIG. 8 is a message flow diagram that schematically illustrates principle steps involved in renewing a temporary subscriber identity. FIG. 8 is a continuation of FIG. 7, assuming that the mobile communications device 52 remains in the service area of the visited network 70 until the expiry time for the temporary subscriber identity 32 elapses. In this example, the TSI client 30 notifies the user of the mobile communications device 52 that the temporary subscriber identity 32 is about to expire by, for example, displaying a message on a display screen of the mobile communications device 52, or sounding a warning tone, or both (step 200).

In step 201, the user of the mobile communications device initiates a renewal function using a TSI client 30 interface, which may be implemented in any desirable way, such as selection of a soft key. The initiation of the renewal function performed in step 201 directs the TSI client 30 to request the temporary subscriber identity renewal (step 202) by sending a TSI renewal message. The TSI renewal message includes the subscriber PIN, the permanent subscriber identity 28, and optionally, the temporary subscriber identity 32 as well as a renewal indication and any other useful information, that is sent in step 202 to the TSI server 54.

The TSI server 54 authenticates the subscriber as described above and requests a new expiry time from the TSI database 56 (step 204). The new expiry time is downloaded in step 206 to the TSI client 30. It should be noted that steps 202 and 206 are performed using a data channel opened by the re-registration performed in step 116 as described above with reference to FIG. 7. In step 208, the mobile communications device 52 stores the new expiry time and restarts the expiry timer. The visited network 70 is, of course, unaware of these transactions and continues serving the roamer as a home subscriber mobile communications device as indicated in step 210. Eventually, perhaps after one or more further renewals, the TSI expiry time elapses and steps 120a-132 described above with reference to FIG. 7 are performed.

Figure 9:
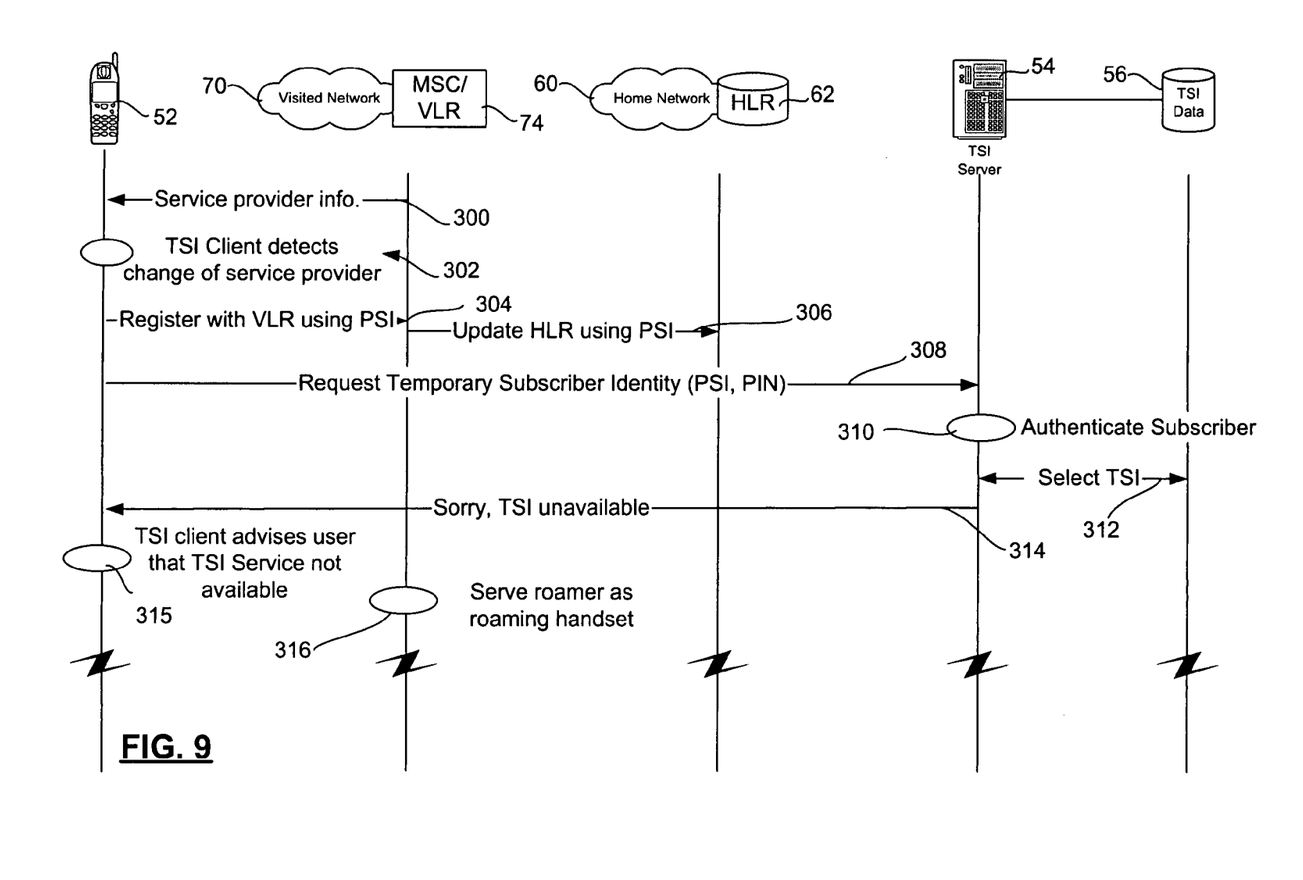
FIG. 9 is a message flow diagram illustrating principle steps involved in responding to a request for a temporary subscriber identity when the temporary subscriber identity is unavailable.

FIG. 9 is a message flow diagram schematically illustrating principle steps in a process in which the mobile communications device 52 attempts to obtain a temporary subscriber identity for a visited network 70 in which the temporary subscriber identity is unavailable. This condition can arise in either one of two circumstances. For example, if all temporary subscriber identities 32 for the visited network 70 are currently in use by other roaming mobile communications devices; or, the mobile communications device 52 is roaming in a service area where the TSI service provider does not own any temporary subscriber identities 32.

In step 300, the roaming mobile communications device 52 acquires service provider information from the visited network 70. The TSI client 30 detects a change a service provider as described above with reference to FIG. 7 (step 302). The TSI client 30 directs the mobile communications device 52 to register with the MSC 74 using the permanent subscriber identity, which the visited network 70 recorded in the VLR of MSC 74 (step 304). The MSC 74 then sends a signaling message to HLR 62 of the home network 60 to update the location information associated with the permanent subscriber identity (step 306). The TSI client 30 then directs the mobile communications device 52 to requests a temporary subscriber identity (step 308) by formulating a TSI request message that is forwarded to the TSI server 54 in step 308. The TSI server authenticates the subscriber and attempts to select a temporary subscriber identity from the TSI database 56 (step 310) as explained above. In this example a temporary service subscriber identity is not available, or there is no service provider in the service area with which the TSI service provider has a TSI service agreement. Consequently, the TSI server 54 returns a denial message (step 312) to the TSI client 30 advising that a temporary subscriber identity is not available. On receipt of the denial message, the TSI client 30 advises the user that the TSI service is unavailable (step 315). This is done, for example, by sounding a tone and displaying a message on a display screen of the mobile communications device 52. Thereafter, the visited network 70 continues to serve the roamer as a roaming mobile communications device 52 (step 316).

As will be understood by persons skilled in the art, after the mobile communications device 52 re-registers using the temporary subscriber identity with a visited network, a mechanism for directing inbound voice and/or data communications to the mobile communications device 52 must be provided. However, the redirection of inbound communications is not within the bounds of the instant invention, and it is not addressed in this disclosure.

As noted above, although the invention has been described with reference to the GSM communications standards, it can be implemented using any mobile communications standard given the methods and systems described above.

As will also be understood by those skilled in the art, the TSI database 56 may be used by a plurality of mobile service providers in a cooperative arrangement. For example, the TSI database may be shared by mobile service providers who each contribute TSIs for accessing their respective networks and service revenues may be shared in accordance with collected usage statistics.

The embodiment(s) of the invention described above are intended to be exemplary only. The scope of the invention is therefore intended to be limited solely by the scope of the appended claims.

We claim:

1. A system for providing a temporary subscriber identity service to a mobile communications device roaming in a service area of a service provider network that does not serve the mobile communications device as a home subscriber, comprising:
  a temporary subscriber identity (TSI) server that receives and processes TSI request messages and provides temporary subscriber identities that were obtained from the service provider and provisioned in the TSI server, to permit the roaming mobile communications device to function as a home subscriber in the service provider network; and
  a TSI client on the mobile communications device that inspects service provider information received from the service provider network, directs temporary registration of the mobile communications device with the service provider network using a permanent subscriber identity assigned to the mobile communications device to open a data communications channel through the service provider network, and sends the TSI request messages over the data communications channel to the TSI server to request the temporary subscriber identity, receives the temporary subscriber identity from the TSI server and directs the mobile communications device to re-register with the service provider, so that the mobile communications device is registered with the service provider as a local service subscriber for at least a predetermined period of time.

2. The system as claimed in claim 1 wherein the TSI client further comprises program instructions for generating a user interface to permit a user of the mobile communications device to input location information that is forwarded to the TSI server.

3. The system as claimed in claim 1 wherein the TSI client further comprises program instructions for generating a user interface that permits a user to select a TSI renewal function for requesting a renewal of a temporary subscriber identity that is due to expire.

4. The system as claimed in claim 1 wherein the mobile communications device further comprises a global positioning system that permits the mobile communications device to determine its location prior to sending the request to the TSI server.

5. The system as claimed in claim 1 wherein the TSI client receives an expiry time with each temporary subscriber identity and operates a timer to determine when the expiry time elapses.

6. The system as claimed in claim 5 wherein the TSI client notifies the user when the expiry time is about to elapse.

7. The system as claimed in claim 6 wherein the TSI server also operates a timer to determine when the expiry time elapses for each temporary subscriber identity it provides.

8. The system as claimed in claim 1 further comprising a database of temporary subscriber identities that is accessed by the TSI sewer to obtain the temporary service subscriber identity provided to the TSI client.

9. The system as claimed in claim 8 wherein the database further comprises subscriber authentication data used to verify that the mobile communications device is registered as a TSI subscriber.

10. A method of providing a temporary subscriber identity to a mobile communications device roaming in a service area of a service provider network that does not serve the mobile communications device as a home subscriber, to permit the roaming mobile communications device to function as a home subscriber in the service provider network, comprising:

receiving a TSI request message from a temporary subscriber identity (TSI) client operating on the mobile communications device requesting a temporary subscriber identity that is registered as a home subscriber identity in the service provider network, to permit the roaming mobile communications device to function as a home subscriber in the service provider network;

authenticating an entitlement of the mobile communications device to a TSI service that provides the temporary subscriber identity;

selecting a temporary subscriber identity that is registered as the home subscriber identity in the service provider network; and returning the temporary subscriber identity to the TSI client.

11. The method as claimed in claim 10 wherein the TSI request message comprises a subscriber personal identification number (PIN), a permanent mobile station integrated services digital network (MSISDN) number; a permanent international mobile station identity (IMSI); and a service provider identification code.

12. The method as claimed in claim 11 wherein selecting the temporary service identity for the mobile communications device comprises retrieving the temporary subscriber identity from a database using the service provider identification code and mobile communications device location information.

13. The method as claimed in claim 10 wherein authenticating the entitlement of the mobile communications device comprises querying an authentication database using at least one of the PIN, the permanent MSISDN and the permanent IMSI.

14. The method as claimed in claim 10 wherein returning the temporary subscriber identity to the TSI client comprises returning a service provider identification code; a temporary mobile station integrated services digital network (MSISDN) number; a temporary international mobile station identity (IMSI) number; a temporary authentication key (Ki); and, a TSI expiry time.

15. A method of obtaining a temporary subscriber identity for a roaming mobile communications device in order to obtain service as a home subscriber from a service provider network serving an area in which the mobile communications device is roaming, comprising:

directing the mobile communications device to register with the service provider network as a roaming mobile device;

formulating a request for a temporary subscriber identity and sending the request through the service provider network to a temporary subscriber identity (TSI) server;

receiving a response from the TSI server containing a service provider identification code and the temporary subscriber identity; and re-registering with a service provider network identified by the service provider identification code using the temporary service subscriber identity.

16. The method as claimed in claim 15 wherein after receiving the temporary subscriber identity, the TSI client staffs a timer to determine when an expiry time received with the temporary subscriber identity elapses.

17. The method as claimed in claim 15 wherein when the TSI client determines that the expiry time is about to elapse, the TSI client notifies a user of the mobile communications device that the TM expiry time is about to elapse.

18. The method as claimed in claim 17 wherein the TSI client further provides a user interface to permit the user of the mobile communications device to select a renewal option for the temporary subscriber identity.

19. The method as claimed in claim 18 wherein the TSI client sends a renewal request message to the TSI server when the user selects the renewal option and receives a new expiry time from the TSI server in response to the renewal request.

20. The method as claimed in claim 15 further comprising generating a user interface to permit a user of the mobile communications device to input location information that is forwarded to the TSI server.

* * * * *